(12) United States Patent
Yoshida et al.

(10) Patent No.: US 10,420,356 B2
(45) Date of Patent: Sep. 24, 2019

(54) METHOD OF PRODUCING PET FOOD

(71) Applicant: Unicharm Corporation, Ehime (JP)

(72) Inventors: Kotaro Yoshida, Itami (JP); Munehiro Usui, Itami (JP)

(73) Assignee: UNICHARM CORPORATION, Ehime (JP)

( * ) Notice: Subject to any disclaimer, the term of this patent is extended or adjusted under 35 U.S.C. 154(b) by 131 days.

(21) Appl. No.: 15/320,902

(22) PCT Filed: May 8, 2015

(86) PCT No.: PCT/JP2015/063388
§ 371 (c)(1),
(2) Date: Dec. 21, 2016

(87) PCT Pub. No.: WO2016/002338
PCT Pub. Date: Jan. 7, 2016

(65) Prior Publication Data
US 2017/0156373 A1    Jun. 8, 2017

(30) Foreign Application Priority Data

Jun. 30, 2014  (JP) ................. 2014-135395

(51) Int. Cl.
*A23K 40/10* (2016.01)
*A23K 40/30* (2016.01)
(Continued)

(52) U.S. Cl.
CPC ............ *A23K 40/10* (2016.05); *A23K 20/158* (2016.05); *A23K 40/25* (2016.05); *A23K 40/30* (2016.05); *A23K 50/40* (2016.05); *A23K 50/42* (2016.05)

(58) Field of Classification Search
CPC ........ A23K 40/10; A23K 50/42; A23K 43/30; A23K 20/158; A23K 40/30; F27D 15/0286
See application file for complete search history.

(56) References Cited

U.S. PATENT DOCUMENTS

| 4,022,915 A | 5/1977 | Zukerman |
| 5,038,498 A * | 8/1991 | Woolsey ................. F26B 17/08 |
| | | 34/203 |

(Continued)

FOREIGN PATENT DOCUMENTS

| CA | 2893038 A1 | 6/2014 | |
| CH | 689544 A5 * | 6/1999 | .............. B01J 3/006 |

(Continued)

OTHER PUBLICATIONS

Loveless, Vacuum Coating: The Pressure's On!, AFB International, Jan. 30, 2014, available at: http://palatantsplus.com/blog/vacuum-coating-the-pressures-on; accessed on Jan. 25, 2019. (Year: 2014).*

(Continued)

*Primary Examiner* — Walter A Moore
(74) *Attorney, Agent, or Firm* — Hauptman Ham, LLP (57) ABSTRACT

Provided is a method of producing pet food including a granulating process of granulating a raw ingredient mixture to obtain food granules; an oil and fat coating process of charging the food granules into a coating pot and coating the food granules with oils and fats; and a food granule heating process of heating the food granules until the temperature thereof becomes 40° C. to 70° C. and charging the food granules into the coating pot.

5 Claims, 2 Drawing Sheets (51) Int. Cl.
    *A23K 20/158* (2016.01)
    *A23K 50/40* (2016.01)
    *A23K 50/42* (2016.01)
    *A23K 40/25* (2016.01)

(56) References Cited

U.S. PATENT DOCUMENTS

| | | | |
|---|---|---|---|
| 6,261,591 B1 | 7/2001 | Kealy | |
| 2010/0303968 A1* | 12/2010 | Sunvold | A23K 40/30 426/92 |
| 2011/0104327 A1 | 5/2011 | Kirejevas | |
| 2014/0134306 A1* | 5/2014 | Sakaji | A23K 1/1628 426/242 |

FOREIGN PATENT DOCUMENTS

| | | | | |
|---|---|---|---|---|
| GB | 2324701 A | 11/1998 | | |
| JP | 62-296847 A | 12/1987 | | |
| JP | 2008-017846 A | 1/2008 | | |
| JP | 2009-225768 A | 10/2009 | | |
| JP | 2010-166853 A | 8/2010 | | |
| JP | 2013-017470 A | 1/2013 | | |
| JP | 2013-158320 A | 8/2013 | | |
| WO | WO-2012173078 A1 * | 12/2012 | ........... | A23K 1/1628 |
| WO | 2014098179 A1 | 6/2014 | | |

OTHER PUBLICATIONS

Rokey, Petfood and fishfood extrusion, The Technology of Extrusion Cooking, Springer Science+Business Media Dordrecht, pp. 144-189. (Year: 1994).*
Extended European Search Report in EP Application No. 15815605.9 dated May 31, 2017.
International Search Report dated Aug. 4, 2015, corresponding to International Application No. PCT/JP2015/063388.
Office Action in JP Application No. 2014-135395, dated Nov. 24, 2015.

* cited by examiner

METHOD OF PRODUCING PET FOOD

RELATED APPLICATIONS

This application is a National Phase of International Application Number PCT/JP2015/063388, filed May 8, 2015, and claims priority to Japanese Patent Application No. 2014-135395, filed on Jun. 30, 2014, the contents of which are incorporated herein by reference.

TECHNICAL FIELD

The present invention relates to a method of producing pet food.

BACKGROUND ART

When food granules of pet food are coated with oils and fats, it is possible to increase the calories of the pet food. Further, it is possible to improve the biting property (palatability) of a pet.

As a method of coating food granules with oils and fats, a vacuum coating method of reducing the pressure applied to food granules in a state in which the food granules are in contact with oils and fats is known.

For example, beef tallow is used as the oils and fats for coating food granules and used by being heated at 40° C. to 50° C. in advance to prepare the beef tallow in a liquid state.

PTL 1 describes a method of coating food granules baked in a furnace (190° C. to 210° C.) provided with a ceramic heater with oils and fats according to a vacuum coating method. In this method, since the baked food granules are cooled while being conveyed by a net conveyor, food granules are coated with oils and fats by charging the food granules into a pot, heating the food granules to 40° C. or higher, adding oils and fats to the pot, reducing the pressure in the pot, and gradually returning the pressure to the atmospheric pressure. Further, PTL 1 describes that solidification of oils and fats can be prevented by heating the food granules to 40° C. before oils and fats are added.

CITATION LIST

Patent Literature

[PTL 1] Japanese Unexamined Patent Application, First Publication No. 2013-17470

SUMMARY OF INVENTION

Technical Problem

However, since a process of coating food granules with oils and fats in a pot using a vacuum coating method or the like is a batch type process, it is difficult to improve production efficiency when a method of producing pet food including such a process is used.

The present invention has been made in consideration of the above-described circumstances, and an object thereof is to improve production efficiency of a method of producing pet food including a process of coating food granules in a pot with oils and fats.

Solution to Problem

The present invention is as follows.

[1] A method of producing pet food including: a granulating process of granulating a raw ingredient mixture to obtain food granules; an oil and fat coating process of charging the food granules into a coating pot and coating the food granules with oils and fats; and a food granule heating process of heating the food granules until the temperature thereof becomes 40° C. to 70° C. and charging the food granules into the coating pot.

[2] The method of producing pet food according to [1], in which the temperature of oils and fats is increased to 40° C. to 70° C. and the oils and fats are added to the food granules in the oil and fat coating process.

[3] The method of producing pet food according to [1] or [2], further including: a process of storing food granules before the food granules are charged into the coating pot, in which the food granule heating process is a process of raising the temperature of the stored food granules before being charged into the coating pot.

[4] The method of producing pet food according to any one of [1] to [3], in which the temperature of food granules being conveyed toward the coating pot is raised in the food granule heating process.

[5] The method of producing pet food according to any one of [1] to [4], in which the oil and fat coating process includes a process of reducing the pressure applied to the food granules charged into the coating pot in a state in which the food granules are in contact with oils and fats and then returning the reduced pressure to the atmospheric pressure.

[6] The method of producing pet food according to any one of [1] to [5], in which the oil and fat coating process includes a first oil and fat coating process of reducing the pressure of food granules charged into the coating pot in a state in which the food granules are in contact with first oils and fats and then returning the pressure to the atmospheric pressure; and a second oil and fat coating process of reducing the pressure of food granules in the coating pot after the first oil and fat coating process in a state in which the food granules are in contact with second oils and fats and then returning the pressure to the atmospheric pressure, and a process of stirring the food granules in the coating pot while maintaining the temperature of an inner wall of the coating pot to 40° C. to 70° C. between the first oil and fat coating process and the second oil and fat coating process.

[7] The method of producing pet food according to any one of [1] to [6], further including: a powder coating process of coating the food granules with a powdery external additive after the oil and fat coating process.

Advantageous Effects of Invention

According to the present invention, it is possible to improve production efficiency of a method of producing pet food including a process of coating food granules in a pot with oils and fats.

DESCRIPTION OF EMBODIMENTS

In the present specification, the term "pet" indicates an animal that has been bred by a person. In a narrower sense, a pet is an animal cared for by the owner. In addition, the "pet food" indicates feed for pets. The pet food of the present embodiment may be sold as the "feed for animals" or "food for animals."

In the present specification, the "coating" of food granules with oils and fats means that oils and fats are applied to the surface of a food granule so as to adhere to the food granule and includes a case where food granules are infiltrated by (impregnated with) a part or the entirety of applied oils and fats.

In the present specification, the "coating" of food granules with powder means that powder is applied to the surface of a food granule so as to adhere to the surface of the food granule.

In the present specification, food granules indicate granular pet food.

The food granules in the present embodiment are not particularly limited as long as the granules are coated with oils and fats. From the viewpoint that granules are easily impregnated with oils and fats, dry type puffed granules are preferable.

The moisture content of dry type food granules is preferably 10% by mass or less and more preferably 9% by mass or less. The lower limit of the moisture content thereof is not particularly limited. The lower limit thereof is typically 5% by mass or greater and more preferably 6% by mass or greater.

The "puffed granules" are granules obtained by forming (granulating) a raw ingredient mixture in a granular shape and also obtained by performing a puffing process. The "puffing process" indicates a process of generating a gas in the inside of the raw ingredient mixture using a technique of carrying out heating, fermentation, a chemical reaction, or pressure reduction. In the puffing process, when a gas is generated, the volume of the raw ingredient mixture is increased so as to have porous properties. Further, when the volume of the raw ingredient mixture is increased, the bulk density thereof is decreased. Before, after, or at the same time with the puffing process, "puffed granules" are obtained by forming the raw ingredient mixture in a granular shape.

The bulk density of the dry type puffed granules is preferably in a range of 300 to 460 g/L, more preferably in a range of 350 to 450 g/L, and still more preferably in a range of 380 to 440 g/L.

In the present specification, the moisture content is a value obtained by the following measurement method.

An object to be measured is ground using a grinder so as to pass through a sieve having an opening diameter of 1 mm and then used as an analytical sample. 2 g to 5 g of the analytical sample is accurately weighed, charged into an aluminum weighing dish (after the sample is dried in advance, the weight thereof is accurately weighed), dried at a temperature of 135±2° C. for 2 hours, and left to be cooled in a desiccator. Next, the weight thereof is accurately weighed, and then the moisture content is acquired from a difference between the weights weighed before and after the drying.

In the present specification, the moisture content of the food granules is a value obtained by measurement immediately after pet food (product) produced by accommodating the food granules in a packaging container to be sealed immediately after production is exposed within 30 days from the date of production or is a value obtained by measurement under the conditions similar to the conditions described above.

In the present specification, the bulk density of food granules is a value obtained by the following measurement method.

Food granules falling from a hopper (funnel-shaped container) are received by a container and the food granules rising from the container are scrapped off using a metal plate or the like such that the container is fulfilled with the food granules. A value obtained by dividing a total mass M (unit: g) of the food granules in the container by an inner volume V (unit: L) of the container, that is, a value of M/V is set as a bulk density (unit: g/L).

In the present specification, the bulk density is a value obtained by measurement immediately after pet food (product) produced by accommodating food granules in a packaging container to be sealed immediately after production is exposed within 30 days from the date of production or is a value obtained by measurement under the conditions similar to the conditions described above.

<Raw Ingredients>

Raw ingredients of food granules are not particularly limited as long as the raw ingredients may be used as feed and known raw ingredients used for producing pet food may be used. Examples thereof include cereals (such as corn, wheat, and rice), beans (such as whole soybeans), vegetable protein (such as corn gluten meal and soybean protein), meat (such as chicken, beef, pork, venison, or meals (such as chicken meal and pork meal)), seafood (such as fish and meals (fish meal)), vegetables, additives (such as vitamins, minerals, an amino acid, flavoring raw ingredients, fibers, colorants, and palatability enhancers), and external additives (oils and fats and palatability enhancers). The meals indicate powder products obtained by compressing and finely grinding meat or seafood.

The external additives indicate components to be added (coating) to raw ingredient mixture after being formed (granulated) in a granular shape.

In the present embodiment, the granulated food granules are coated with at least oils and fats as an external additive. Oils and fats used for coating food granules may be vegetable oils and fats or animal oils and fats. The oils and fats may be used alone or in combination of two or more kinds thereof.

As the oils and fats used for coating food granules, oils and fats having a melting point of 35° C. or higher are preferable. When the melting point of oils and fats used for coating food granules is in the above-described range, infiltration of oils and fats into pet food during storage is unlikely to occur. Examples of oils and fats having a melting point of 35° C. or higher include animal oils and fats such as beef tallow (melting point of 35° C. to 55° C.), lard (melting point of 28° C. to 48° C.), and chicken fat (melting point of 30° C. to 40° C.); vegetable oils and fats such as palm oil (melting point of 27° C. to 50° C.); and a mixture of these. The oils and fats may be used alone or in combination of two or more kinds thereof.

The coating amount of oils and fats is preferably in a range of 3% to 20% by mass and more preferably in a range of 4% to 16% by mass with respect to the total amount of pet food (including external additives). When the coating amount of oils and fats is in the above-described range, the balance between palatability and suitable intake amount of oils and fats may be easily obtained.

A mixture obtained by mixing mill extracts with oils and fats may be used for coating food granules. Preferred examples of the mill extracts include known mill extracts such as a chicken extract (extract derived from chicken) and a fish extract (extract derived from fish).

It is preferable that food granules are coated with oils and fats and then coated with a powdery (powder) or liquid palatability enhancer as an external additive.

Examples of the palatability enhancer include an animal raw ingredient decomposition product, a vegetable raw ingredient decomposition product, a yeast extract, yeast, seafood, an amino acid, and a nucleic acid. The palatability enhancer may be used alone or in combination of two or more kinds thereof.

The amount of the palatability enhancer to be added is preferably in a range of 0.1% to 10% by mass and more preferably in a range of 1% to 5% by mass with respect to the total amount of pet food (including external additives).

The blending of raw ingredients is not particularly limited. It is preferable that the raw ingredients are set to be blended such that the target nutritional composition of food granules to be obtained and excellent formability are obtained.

A blending (including external additives) example of dry type food granules is described below.

(Blending Example of Dry Type Food Granules)

10% to 70% by mass of cereals, beans, and starch in total; 15% to 45% by mass of meat and seafood in total; 0% to 20% by mass of vegetable protein; 3% to 20% by mass of external additives; and other components as the remainder.

Method of Producing Pet Food

First Embodiment

Figure 1:
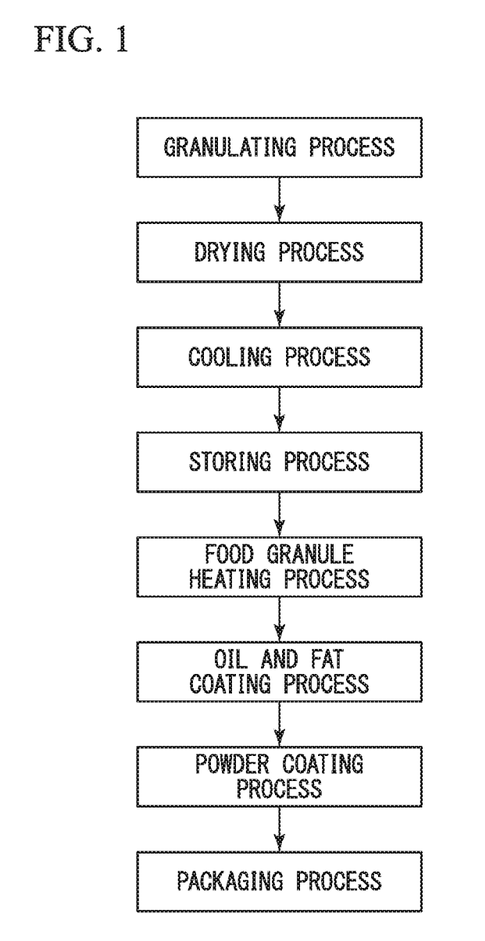
FIG. 1 is a diagram showing processes according to an embodiment of the present invention.

FIG. 1 is a diagram showing processes of a method of producing pet food according to an embodiment of the present invention.

[Granulating Process]

In a granulating process, a raw ingredient mixture is granulated to obtain food granules. As a method of mixing raw ingredients to obtain a raw ingredient mixture and a method of forming (granulating) the raw ingredient mixture in a granular shape, known methods may be used.

For example, a method of producing puffed granules using an extruder may be preferably used.

As a method of producing puffed granules using the extruder, for example, a method described in "Small Animal Clinical Nutrition 4th Edition" (edited by Michael S. Hand, Craig D. Thatcher, Rebecca L. Remillard, and Philip Roudebusg, published by Mark Morris Associates; 2000; p 157 to 190) may be used.

An example of a method of producing puffed granules using the extruder will be described. First, raw ingredients other than the external additives in raw ingredients of puffed granules are ground and then mixed with each other if necessary. The raw ingredients may be mixed while being ground using a grinder. Further, a raw ingredient mixture is obtained by adding water (not included in the raw ingredient composition) thereto if necessary.

After the obtained raw ingredient mixture is charged into the extruder, heated, and pressed, the mixture is extruded from an outlet. The outlet is provided with a plate in which a hole having a predetermined shape is formed and a cutter which cuts the raw ingredient mixture extruded from the plate to have a predetermined length (thickness). The raw ingredient mixture is extruded from the hole of the plate, formed in a predetermined shape by being cut with the cutter, and released to the atmospheric pressure from the pressurized state. In this manner, water vapor in the raw ingredient mixture is expanded and then the raw ingredient mixture is puffed, thereby obtaining porous granules.

[Drying Process]

The granules obtained in the above-described manner are dried to have a predetermined moisture content if necessary to obtain puffed granules (food granules). In a case where dry type food granules are produced, a drying process is indispensable.

For example, the moisture content of granules to be discharged from the extruder is in a range of 10% to 20% by mass. When the moisture content of food granules is in the above-described range, excellent formability may be obtained.

The temperature of granules to be discharged from the extruder depends on the heating temperature in the extruder, for example, in a range of 90° C. to 150° C.

A known method may be suitably used as the method of drying granules discharged from the extruder. Examples thereof include a hot air drying method of drying granules by blowing hot air to the granules, a reduced pressure drying method, and a method of frying granules in oil. For example, a hot air drying method using a conveyor type hot air dryer is preferable.

The drying conditions (temperature and time) are not limited as long as the temperature of granules is raised to 100° C. or higher to evaporate moisture in the granules without causing thermal denaturation of components in granules so that the moisture content is adjusted to a desired value.

For example, in a case where granules are dried using a hot air drier, the temperature of hot air to be brought into contact with the granules is preferably in a range of 100° C. to 140° C. and more preferably in a range of 100° C. to 110° C. The drying time is not particularly limited and granules may be dried, for example, for 5 to 20 minutes.

The shape of food granules is not particularly limited as long as the shape is suitable for a pet to eat and any kind of shape such as a spherical shape, a polygonal shape, a cylindrical shape, a donut shape, a plate shape, a go stone shape (circular, curved tablet; oval), a heart shape, a star shape, a fish shape, or a wheel shape may be used.

Further, in regard to the size of puffed granules, the puffed granules may be small such that a pet can fit all of it in their mouth or may be large such that a pet can bite into the food plural times.

For example, in regard to the size of puffed granules, both of the shortest diameter and the longest diameter are preferably in a range of 1 to 50 mm, more preferably in a range of 3 to 40 mm, and still more preferably in a range of 4 to 30 mm.

[Cooling Process and Storing Process]

In the present embodiment, the dried food granules are temporarily stored in a storage container. The storage container is not particularly limited. For example, a predetermined amount of food granules is accommodated in a bag packaging material which is referred to as a flexible container.

The temperature of food granules to be accommodated in the storage container is preferably 60° C. or lower. When of food granules to be accommodated in the storage container is in the above-mentioned range, it is possible to prevent occurrence of dew condensation during the storage. The lower limit of the temperature of food granules is not particularly limited.

Consequently, it is preferable that a cooling process is provided after the drying process if necessary. The cooling method may be a method of lowering the temperature of food granules to a predetermined temperature. A method of naturally cooling food granules at room temperature or a method of blowing air at room temperature or cold air at room temperature or lower to food granules may be used.

From the viewpoint of satisfactory production efficiency, a method of continuously cooling granules by continuously drying granules discharged from the extruder using a conveyor type hot air drier and blowing air at room temperature or cold air to the granules while conveying the granules with the conveyor is particularly preferable.

By providing the storing process, the rate of producing food granules in the extruder may be more increased than the rate of producing food granules in an oil and fat coating process described below. In this manner, the productivity may be improved by efficiently operating the extruder.

Further, food granules may be conveyed during the storing process. A process before the storing process and a process after the storing process may be performed at different places by conveying food granules. In this manner, the production efficiency may be improved.

In a case of providing the storing process, the temperature of food granules is increased during a food granule heating process described below before the stored food granules are charged into a coating pot.

[Food Granule Heating Process]

In the case of providing the storing process, the food granule heating process is performed after the storage.

The food granule heating process is a process of heating food granules at a temperature lower than a set temperature of food granules immediately before the food granules are charged into the coating pot (hereinafter, referred to as a predetermined charging temperature) so that the temperature reaches the set temperature and charging the food granules into the coating pot.

In the present embodiment, the stored food granules are discharged from the storage container, conveyed toward the coating pot, continuously heated during conveyance, and rapidly charged into the coating pot before the temperature of food granules is decreased.

Specifically, it is preferable that food granules are conveyed with the conveyor toward the coating pot and a continuous heating device is provided in the path of the conveyance. As the continuous heating device, a heating device which includes a tunnel-like heating furnace that is capable of holding the temperature in the furnace to a predetermined temperature and arranges food granules on a net conveyor to pass through the heating furnace may be used. The heat source in the heating furnace is not particularly limited, and examples thereof include a ceramic heater, a gas burner, steam, and superheated steam. Among these, from the viewpoint of efficiency of heating the surface of a food granule, a gas burner is particularly preferable.

In the present invention, the predetermined charge temperature is in a range of 40° C. to 70° C. and the temperature of food granules is increased to the predetermined charge temperature (in the range of 40° C. to 70° C.) in the food granule heating process. The temperature of food granules immediately before the food granule heating process is lower than the predetermined charge temperature.

If the predetermined charge temperature is 40° C. or higher, the viscosity of oils and fats may be reliably suppressed from becoming high when oils and fats are brought into contact with food granules in the coating pot. When the predetermined charge temperature is 70° C. or lower, powder may be reliably and satisfactorily adhered to food granules when the food granules are coated with powder later. Further, dew condensation is unlikely to occur during the subsequent packaging process and processes before and after the packaging process.

The predetermined charge temperature, that is, the reaching temperature in the food granule heating process is more preferably in a range of 40° C. to 60° C. and particularly preferably in a range of 40° C. to 50° C.

The heating conditions (temperature and time) in the food granule heating process are not limited as long as the temperature of granules may be raised to the target reaching temperature without causing thermal denaturation of components in granules. For example, the temperature of the tunnel-like heating furnace is preferably in a range of 100° C. to 250° C. and more preferably in a range of 180° C. to 220° C. The time for food granules to pass through the heating furnace is preferably in a range of 1 to 6 minutes and more preferably in a range of 1 to 3 minutes.

[Oil and Fat Coating Process]

In the oil and fat coating process, food granules heated during the food granule heating process are charged into the coating pot and oils and fats are added to the food granules so that the food granules are coated with the oils and fats.

Since the food granules charged into the coating pot are already heated, oils and fats may be added to the food granules immediately after the food granules are charged therein. Alternatively, the charging of food granules into the coating pot and the addition of oils and fats to food granules may be carried out at the same time.

In the case where the time from the start when food granules are charged into the coating pot to the start when oils and fats are charged into the coating pot is short, the production efficiency may be further improved. For example, the time thereof is preferably in a range of 0 to 3 minutes and more preferably in a range of 0 to 1 minute.

The temperature of oils and fats immediately before being added to food granules (hereinafter, referred to as the addition temperature) is preferably in a range of 40° C. to 70° C. Accordingly, it is preferable that the temperature of oils and fats to be added to food granules is increased to the addition temperature of 40° C. to 70° C. in advance. It is preferable that the temperature of heated oils and fats is maintained if necessary. When the addition temperature of oils and fats is 40° C. or greater, the oils and fats changes to a liquid state, such that the oils and fats may be easily applied to food granules. When the addition temperature thereof is 70° C. or lower, oils and fats are unlikely to be oxidized. The addition temperature of oils and fats is more preferably in a range of 40° C. to 60° C. and particularly preferably in a range of 40° C. to 50° C.

The predetermined charge temperature and the addition temperature of oils and fats may be the same as or different from each other. The predetermined charge temperature may be higher than the addition temperature of oils and fats or the addition temperature of oils and fats may be higher than the predetermined charge temperature.

The method of adding oils and fats to food granules and coating the food granules with the oils and fats may be a method that includes a process of coating food granules with oils and fats in the pot, and a known method may be suitably used.

For example, a vacuum coating method of reducing the pressure applied to food granules charged into the coating pot in a state in which the food granules are in contact with oils and fats and then returning the pressure to the atmospheric pressure is preferable. Alternatively, a method of adding oils and fats to food granules charged into the coating pot and stirring the mixture without reducing the pressure so that the food granules are coated with oils and fats may be used. From the viewpoint that food granules may be impregnated with a larger amount of oils and fats, a vacuum coating method is preferable.

In any of the above-mentioned methods, it is preferable that the temperature of the inner wall of the pot is maintained at 40° C. or higher. The pot may be heated if necessary. It is preferable that the upper limit of the temperature of the inner wall of the pot is controlled to be 70° C. or lower.

In the vacuum coating method, the pressure reduction rate at the time of reducing the pressure applied to food granules in a state in which the food granules are in contact with oils and fats may be in a degree that the food granules are impregnated with oils and fats and is appropriately set according to the size or the hardness of food granules. For example, the pressure is reduced to preferably in a range of 0.1 to 0.3 atm ($10.13 \times 10^3$ Pa to $30.39 \times 10^3$ Pa).

Specifically, food granules heated to the predetermined charge temperature are charged into the coating pot and oils and fats heated to the addition temperature are added to the coating pot while the food granules are stirred. After the mixture is stirred for 2 to 4 minutes in this state, the pressure in the pot is reduced to a predetermined pressure while the stirring is continued. The time required for reducing the pressure is preferably in a range of 1 to 4 minutes. The pressure is gradually returned to the atmospheric pressure while the stirring is continued. The time required for returning the pressure to the atmospheric pressure is preferably in a range of 1 to 10 minutes and more preferably in a range of 3 to 5 minutes.

In this manner, a state in which food granules are coated with oils and fats is obtained.

[Powder Coating Process]

In the present embodiment, food granules are coated with oils and fats and then a powder coating process is performed. Subsequently, it is preferable that the temperature of the inner wall of the pot is controlled to be in a range of 40° C. to 70° C.

The powder coating process is a process of coating food granules, coated with oils and fats, with a powdery (powder) external additive.

Specifically, after food granules are coated with oils and fats in the coating pot, a powdery external additive is added to the pot, and then the food granules are coated with the powder by stirring the mixture.

In a case of vacuum coating method, the reduced pressure is returned to the atmospheric pressure, a powdery external additive is added while stirring is continued, and then the food granules are coated with powder by stirring the mixture.

[Packaging Process]

In this manner, pet food formed by coating food granules with oils and fats and a powdery external additive is obtained.

Such pet food is taken out of the pot and left to be cooled if necessary, and a predetermined amount of pet food is packaged, thereby obtaining a pet food product.

[Effects]

In the related art, the temperature of food granules is increased using a method of charging food granules in a coating pot, adjusting the temperature of the inner wall of the pot to be in a range of 40° C. to 70° C., and stirring the food granules in the pot. However, since the rate of increasing the temperature of food granules is low when this method is used and there is a limitation to improve the rate of increasing the temperature of food granules, this method is a cause of degrading the production efficiency of pet food.

According to the present embodiment, since the temperature of food granules is increased to the predetermined charge temperature before the food granules are charged into the coating pot, it is possible to improve the rate of increasing the temperature of food granules and the production efficiency of pet food.

Further, when the process of increasing the temperature of food granules is not performed in the pot, it is possible to shorten the process performed in a batch type (in the pot) process and to improve the production efficiency of pet food.

Other Embodiments

In the first embodiment described above, food granules are coated with oils and fats once during the oil and fat coating process, but food granules may be coated with oils and fats two or more times.

For example, when food granules are coated with second oils and fats after the food granules are coated with first oils and fats using a vacuum coating method and impregnated with the first oils and fats, a state of distribution in which the first oils and fats are present in the inside of the food granules and the second oils and fats are present outside the food granules is obtained.

In this case, when the coating of food granules with the second oils and fats is also carried out using a vacuum coating method, there are advantages that hands of a person feeding a pet are unlikely to be soiled because the amount of oils and fats present on the surface of food granules is decreased and falling of oils and fats off from the surface of a food granule may be reduced.

In addition, the above-described powder coating process may be performed after food granules are coated with the second oils and fats.

Figure 2:
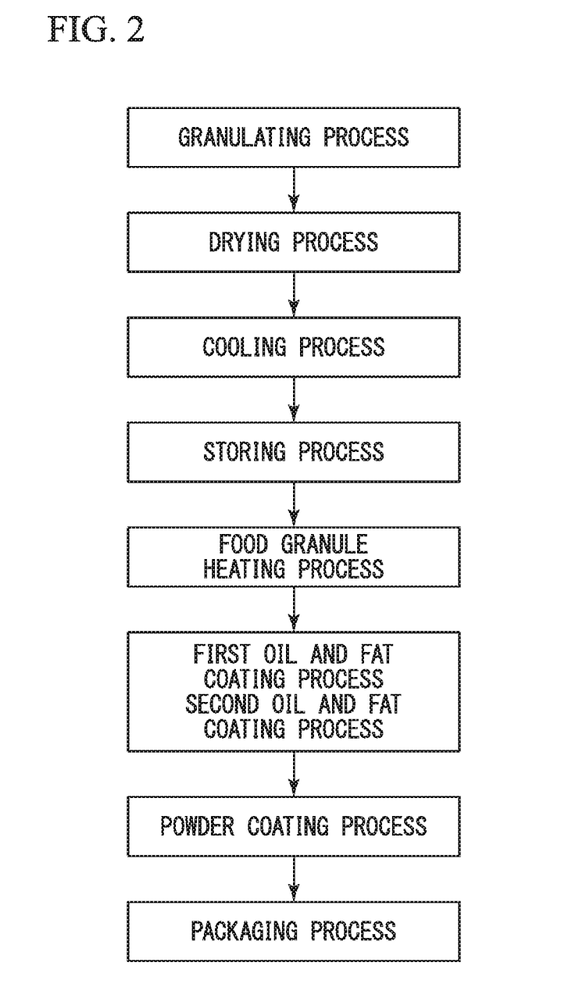
FIG. 2 is a diagram showing processes according to another embodiment of the present invention.

For example, an embodiment illustrated in FIG. 2 is preferable.

In the oil and fat coating process of the present embodiment, a first oil and fat coating process of reducing the pressure applied to food granules charged into the coating pot in a state in which the food granules are in contact with the first oils and fats and then returning the pressure to the atmospheric pressure is performed and then a second oil and fat coating process of reducing the pressure applied to food granules in the coating pot in a state in which the food granules are in contact with the second oils and fats and then returning the pressure to the atmospheric pressure is performed. Between the first oil and fat coating process and the second oil and fat coating process, food granules in the coating pot are stirred while the temperature of the inner wall of the coating pot is maintained to 40° C. to 70° C. Other processes are the same as those of the first embodiment.

In the present embodiment, it is preferable that animal oils and fats such as beef tallow are used as the first oils and fats and vegetable oils and fats such as palm oil are used as the second oils and fats. In this case, since a state of distribution in which animal oils and fats are present in the inside of food granules and vegetable oils and fats are present outside the food granules is obtained, a smell peculiar to animal oils and fats emitted from the animal oils and fats may be reduced.

In the present embodiment, the method of coating food granules with oils and fats two times is used. Even in this method, the production efficiency of pet food may be improved by increasing the temperature of food granules to the predetermined charge temperature, before the food granules are charged into the coating pot.

In each embodiment described above, food granules are continuously heated while being conveyed using a continuous heating device in the food granule heating process, but food granules may be heated without conveyance using a heating device whose heat source is steam or superheated steam.

From the viewpoints that the temperature of each granule is easily increased and excellent production efficiency is easily obtained, it is preferable that food granules are heated during conveyance compared to a case where food granules are heated without conveyance.

Moreover, in each embodiment described above, the powder coating process of coating food granules with oils and fats is performed, but food granules may be coated with a liquid external additive in place of a powdery external additive or may be coated with both of a liquid external additive and a powdery external additive.

EXAMPLES

The present invention will be described in detail with reference to the examples described below, but the present invention is not limited thereto.

Example 1

In the process shown in FIG. 1, pet food having the following composition (including external additives) was produced.

Pet food was produced by blending 47.5% by mass of cereals, 23% by mass of meat, 8.5% by mass of vegetable protein, 16% by mass of external additives, and 5% by mass of other additives. The external additives include 13% by mass of beef tallow and 3.5% by mass of a palatability enhancer.

The remaining raw ingredients from which external additives were excluded were mixed with each other while being ground using a grinder, thereby obtaining a raw ingredient mixture.

The obtained raw ingredient mixture was granulated using an extruder and then puffed granules (food granules) in a circular tablet shape having a diameter of 9 mm and a height (thickness) of 4 mm were obtained (granulating process).

The temperature of food granules immediately after being discharged from the extruder was approximately 90° C. The food granules were continuously dried such that the moisture content thereof became 9% by mass using a conveyor type hot air drier according to a method of blowing hot air at 110° C. (drying process).

The food granules coming out of the hot air drier were cooled such that the temperature thereof became approximately 40° C. according to a method of blowing air at room temperature (approximately 25° C.) (cooling process).

The food granules cooled to approximately 40° C. were accommodated to a flexible container for temporary storage (storing process).

Food granules stored in the flexible container for approximately 24 hours were discharged onto a conveyor and conveyed toward a coating pot. The temperature of food granules was room temperature.

The food granules were heated by passing through a tunnel-like heating furnace (at 200° C. in the furnace) during the conveyance and the temperature of food granules was increased to 60° C. (food granule heating process).

160 kg of food granules coming out of the heating furnace were rapidly charged into the coating pot.

Separately from the processes described above, beef tallow was heated to approximately 50° C. in advance and the temperature was maintained. The temperature of the inner wall of the coating pot was automatically controlled such that a variation in temperature of the inner wall was in a range of 40° C. to 70° C.

The beef tallow (50° C.) was added to the food granules in the coating pot while the food granules were stirred and the stirring was continued for 2 minutes. The beef tallow was started to be added to food granules at the same time when the food granules were started to be charged into the coating pot.

Thereafter, the pressure in the pot was reduced to 10130 Pa for 2 minutes while the stirring was continued and then the reduced pressure was gradually returned to atmospheric pressure for 4 minutes (oil and fat coating process).

A powdery palatability enhancer was added to the food granules coated with oils and fats in the pot while the food granules were stirred and then the stirring was further continued for 2 minutes (powder coating process).

Food granules coated with the palatability enhancer in this manner were discharged onto the conveyor from the coating pot. The temperature of food granules immediately after the discharge was approximately 50° C. The temperature of the food granules became room temperature during the conveyance from the coating pot to a packaging device. A predetermined amount of food granules were packaged by the packaging device, thereby obtaining a pet food product.

Example 2

In the process shown in FIG. 2, pet food having the following composition (including external additives) was produced.

Pet food was produced by blending 27% by mass of cereals, 44% by mass of meat, 6% by mass of vegetable protein, 18% by mass of external additives, and 5% by mass of other additives. The external additives include 9% by mass of beef tallow, 5.5% by mass of palm oil, and 3.5% by mass of a palatability enhancer.

The remaining raw ingredients from which external additives were excluded were mixed with each other while being ground using a grinder, thereby obtaining a raw ingredient mixture.

Hereinafter, the processes before the food granule heating process were performed in the same manner as in Example 1.

170 kg of food granules after the food granule heating process was finished were rapidly charged into the coating pot. Separately from the processes described above, beef tallow was heated to approximately 50° C. in advance and the temperature was maintained. Further, palm oil was heated to approximately 50° C. and the temperature was maintained. The temperature of the inner wall of the coating pot was automatically controlled such that a variation in temperature of the inner wall was in a range of 40° C. to 70° C.

The beef tallow (50° C.) was added to the food granules in the coating pot while the food granules were stirred and the stirring was continued for 2 minutes. The beef tallow was started to be added to food granules at the same time when the food granules were started to be charged into the coating pot.

Thereafter, the pressure in the pot was reduced to 10130 Pa for 2 minutes while the stirring was continued and then the reduced pressure was gradually returned to atmospheric pressure for 4 minutes (first oil and fat coating process).

In this state, palm oil (50° C.) was added to the food granules while the food granules were stirred and the stirring was continued for 2 minutes. Thereafter, the pressure in the pot was reduced to 10130 Pa for 2 minutes while the stirring was continued and then the reduced pressure was gradually returned to atmospheric pressure for 4 minutes (second oil and fat coating process).

Further, a powdery palatability enhancer was added to the food granules coated with oils and fats in the pot while the food granules were stirred and then the stirring was further continued for 2 minutes (powder coating process).

Food granules coated with the palatability enhancer in this manner were discharged onto the conveyor from the coating pot. The temperature of food granules immediately after the discharge was approximately 50° C. The temperature of the food granules became room temperature during the conveyance from the coating pot to a packaging device. A predetermined amount of food granules were packaged by the packaging device, thereby obtaining a pet food product.

Hereinbefore, preferred examples of the present invention have been described, but the present invention is not limited thereto. Addition, omission, substitution, and other modifications of configurations are possible within the range not departing from the scope of the present invention. Further, the present invention is not limited by the description above and only limited by the range of claims.

The invention claimed is:

1. A method of producing pet food comprising:
   a granulating process of granulating a raw ingredient mixture to obtain food granules;
   a drying process of drying the food granules by raising a temperature to 100° C. or higher after the granulating process;
   a cooling process of cooling the dried food granules to 60° C. or less after the drying process;
   a storing process of storing the cooled food granules in a storage container after the cooling process;
   a process of conveying the food granules which have been stored in the storage container toward a coating pot after the storing process;
   a food granule heating process of heating the food granules which have been stored in the storage container until the temperature thereof becomes 40° C. to 70° C. and charging the heated food granules into the coating pot after the storing process; and
   an oil and fat coating process of coating the food granules, which have been charged into the coating pot, with oils and fats,
   wherein the temperature of food granules being conveyed toward the coating pot is raised in the food granule heating process.

2. The method of producing pet food according to claim 1,
   wherein the temperature of oils and fats is increased to 40° C. to 70° C. and the oils and fats are added to the food granules in the oil and fat coating process.

3. The method of producing pet food according to claim 1,
   wherein the oil and fat coating process includes a process of reducing the pressure applied to the food granules charged into the coating pot in a state in which the food granules are in contact with oils and fats and then returning the reduced pressure to the atmospheric pressure.

4. The method of producing pet food according to claim 1,
   wherein the oil and fat coating process includes a first oil and fat coating process of reducing the pressure of food granules charged into the coating pot in a state in which the food granules are in contact with first oils and fats and then returning the pressure to the atmospheric pressure; and a second oil and fat coating process of reducing the pressure of food granules in the coating pot after the first oil and fat coating process in a state in which the food granules are in contact with second oils and fats and then returning the pressure to the atmospheric pressure, and
   a process of stirring the food granules in the coating pot while maintaining the temperature of an inner wall of the coating pot to 40° C. to 70° C. between the first oil and fat coating process and the second oil and fat coating process.

5. The method of producing pet food according to claim 1, further comprising:
   a powder coating process of coating the food granules with a powdery external additive after the oil and fat coating process.

* * * * *